US011841911B2

(12) United States Patent
Li et al.

(10) Patent No.: US 11,841,911 B2
(45) Date of Patent: Dec. 12, 2023

(54) SCALABLE RETRIEVAL SYSTEM FOR SUGGESTING TEXTUAL CONTENT

(71) Applicant: Microsoft Technology Licensing, LLC, Redmond, WA (US)

(72) Inventors: Ji Li, San Jose, CA (US); Amit Srivastava, San Jose, CA (US); Adit Krishnan, Mountain View, CA (US); Aman Malik, New Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 17/530,982

(22) Filed: Nov. 19, 2021

(65) Prior Publication Data

US 2023/0161825 A1    May 25, 2023

(51) Int. Cl.
*G06F 17/00* (2019.01)
*G06F 16/953* (2019.01)
*G06N 20/00* (2019.01)

(52) U.S. Cl.
CPC ........... *G06F 16/953* (2019.01); *G06N 20/00* (2019.01)

(58) Field of Classification Search
CPC .. G06F 16/953; G06F 16/2455; G06F 16/248; G06F 16/243; G06N 20/00
See application file for complete search history.

(56) References Cited

U.S. PATENT DOCUMENTS

| 8,799,250 | B1* | 8/2014 | Smith | G06F 16/9535 |
| | | | | 707/705 |
| 10,552,431 | B2* | 2/2020 | Kshetramade | G06Q 50/01 |
| 10,706,450 | B1 | 7/2020 | Tavernier | |
| 2005/0240612 | A1* | 10/2005 | Holden | G06Q 10/04 |
| | | | | 707/999.102 |
| 2021/0004682 | A1 | 1/2021 | Gong et al. | |

(Continued)

OTHER PUBLICATIONS

Wen Mi et al., Text Content Tag Recommendation Algorithm Based on Knowledge Map Fusion Reasoning, In Proceedings of the 2021 1st International Conference on Control and Intelligent Robtics, Association for Computing Machinery, 740-745, <https://doi.org/10.1145.3473843>, Jun. (Year: 2021).*

(Continued)

*Primary Examiner* — Greta L Robinson
(74) *Attorney, Agent, or Firm* — Novo TechIP International PLLC

(57) ABSTRACT

A data processing system implements receiving query text for a search query for textual content recommendation. The query text includes one or more words indicating a type of textual content items being sought. The system implements analyzing the query text using a first machine learning (ML) model to obtain encoded query text, where the first ML model is trained to identify features within the query text and to generate the encoded query text by mapping the features to a hyper-dimensional latent space (HDLS). The system implements identifying one or more content items in a database of encoded content items mapped to the HDLS that satisfy the search query by comparing attributes of the encoded query text with attributes of the encoded content items to identify content items that are closest to the encoded query text within the HDLS, and causing the one or more content items to be displayed.

20 Claims, 10 Drawing Sheets

(56) References Cited

U.S. PATENT DOCUMENTS

2021/0073215 A1\* 3/2021 Srinivasaraghavan ..................... G06F 16/2425

OTHER PUBLICATIONS

Oppermann, et al., "VizCommender: Computing Text-Based Similarity in Visualization Repositories for Content—Based Recommendations", In Journal of IEEE Transactions on Visualization and Computer Graphics, vol. 27, Issue 2, Oct. 13, 2020, pp. 495-505.

"International Search Report and Written Opinion Issued in PCT Application No. PCT/US22/041794", dated Nov. 15, 2022, 13 Pages.

Tiu, Ekin, "Understanding Latent Space in Machine Learning", Retrieved From: https://towardsdatascience.com/understanding-latent-space-in-machine-learning-de5a7c687d8d#:-:text=The%20latent%20space%20is%20simply,representations%2Oof%20data%20for%20analysis, Feb. 4, 2020, 14 pages.

\* cited by examiner

SCALABLE RETRIEVAL SYSTEM FOR SUGGESTING TEXTUAL CONTENT

BACKGROUND

Numerous applications provide means for users to design flyers, invitations, greeting cards, advertisements, and other types of electronic content. Many of these applications provide sets of default content items or templates that include commonly used textual and/or graphical content associated with various topics. A user may browse through a set of templates and select a template to provide a starting point for creating new content. The user typically customizes the textual content, the layout, and/or other elements of the template to suit the user's needs.

Some applications may also provide user means to enter a search query to search for content items related to keywords or phrases included in the search query. These searches may be implemented using machine learning models that predict which content to recommend to a user based on the search query. However, current approaches using machine learning models are not sufficiently scalable to support the vast number of topics for which users may search for content recommendations. The capabilities of current machine learning models are strained by continued emergences of new topics of interest for which users may search for content recommendations, but the machine learning models have not been trained to recognize these new topics and may provide no content recommendations or poor content recommendations for these topics. Hence, there is a need for improved systems and methods that provide a scalable and adaptable retrieval system for suggesting textual content.

SUMMARY

An example data processing system according to the disclosure may include a processor and a machine-readable medium storing executable instructions. The instructions when executed cause the processor to perform operations including receiving, from a client device, query text for a search query for a textual content recommendation, the query text comprising one or more words indicating a type of textual content items being sought; providing the query text at an input to a first machine learning model; analyzing the query text using the first machine learning model to obtain encoded query text, the first machine learning model being trained to identify features within the query text and to generate the encoded query text by mapping the features to a hyper-dimensional latent space (HDLS); identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and causing the one or more content items to be presented on a display of the client device.

An example method implemented in a data processing system for providing content recommendations includes receiving, from a client device, query text for a search query for a textual content recommendation, the query text comprising one or more words indicating a type of textual content items being sought; providing the query text at an input to a first machine learning model; analyzing the query text using the first machine learning model to obtain encoded query text, the first machine learning model being trained to identify features within the query text and to generate the encoded query text by mapping the features to a hyper-dimensional latent space (HDLS); identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and causing the one or more content items to be presented on a display of the client device.

An example machine-readable medium on which are stored instructions. The instructions when executed cause a processor of a programmable device to perform operations of receiving, from a client device, query text for a search query for a textual content recommendation, the query text comprising one or more words indicating a type of textual content items being sought; providing the query text at an input to a first machine learning model; analyzing the query text using the first machine learning model to obtain encoded query text, the first machine learning model being trained to identify features within the query text and to generate the encoded query text by mapping the features to a hyper-dimensional latent space (HDLS); identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and causing the one or more content items to be presented on a display of the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing a scalable, machine-learning driven retrieval system for suggesting content items are described herein. The content items may include default textual content and a default layout for presentations, flyers, invitations, advertisements, greeting cards, and other types of electronic content. The default textual content may include textual content typically used in and appropriate for the type of electronic content being created. The content items may be provided in a preformatted template that includes layout information, graphical content, and other materials in addition to the textual content. A user may customize the textual content and layout of a content item to create a new electronic content that suits the needs of the user.

The scalable content retrieval system described herein provides a technical solution to the technical problem of scalability of current machine learning based content retrieval systems by providing a unique scalable architecture. This architecture provides separate machine-learning driven pipelines for processing user queries and for encoding content items to be added to the scalable retrieval system. The machine learning models used in the machine-learning driven pipelines are trained to encode the user queries and the content items into a common hyper-dimensional latent space that facilitates identifying content items that most closely match the user queries. This architecture is accurate, highly scalable, and provides low latency querying for content items. New content items may be added to the scalable content retrieval system at any time. These content items may be analyzed and added to the system offline to avoid impacting the performance of user queries. Furthermore, the machine-learning models utilized by the scalable retrieval system may also evolve over time based on user feedback to further improve the quality and accuracy of the recommendations provided by the system. These and other technical benefits of the techniques disclosed herein will be evident from the discussion of the example implementations that follow.

Figure 1:
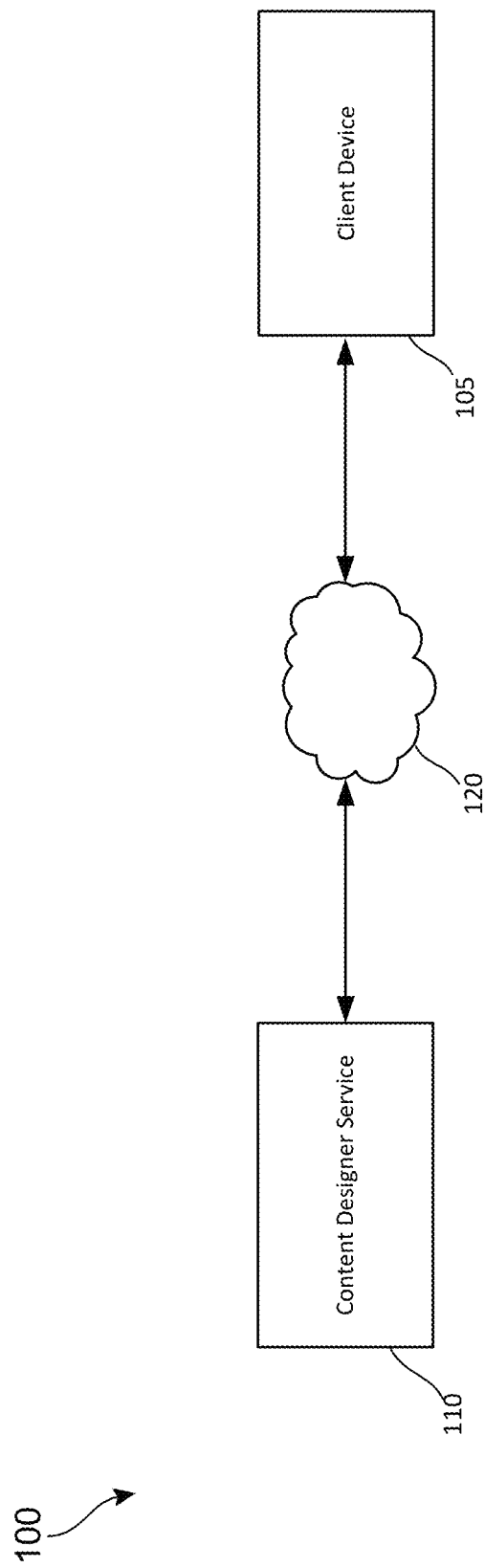
FIG. 1 is a diagram showing an example computing environment in which the techniques disclosed herein may be implemented.

FIG. 1 is a diagram showing an example computing environment 100 in which the techniques for providing scalable retrieval system for suggesting content items may be implemented. The computing environment 100 may include a content designer service 110 that implements the scalable content retrieval system techniques described herein. The example computing environment 100 may also include one or more client devices, such as the client device 105. The client device 105 may communicate with the content designer service 110 via the network 120.

In the example shown in FIG. 1, the content designer service 110 is implemented as a cloud-based service or set of services. The content designer service 110 may implement a word processing application, a presentation design application, and/or other type of applications in which a user may search for and utilize content recommendations for creating new electronic content. The content designer service 110 may be provide a user interface that enables users to create electronic content, such as but not limited to presentations, flyers, invitations, advertisements, greeting cards, and other types of electronic content. The content designer service 110 provides means for the user to search for content recommendations for the electronic content being created. The content designer service 110 may utilize various machine learning models to implement this search and recommendation functionality. Additional details of the search and recommendation functionality is provided in the examples which follow.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes one client device, other implementations may include multiple client devices that may utilize the application service 125. Furthermore, in some implementations, the application functionality provided by the application service 125 may be implemented by a native application installed on the client device 105, and the client device 105 may communicate directly with the content designer service 110 over a network connection. Moreover, while a single client device 105 is shown in FIG. 1, the content designer service 110 may support many such client devices simultaneously.

Figure 2:
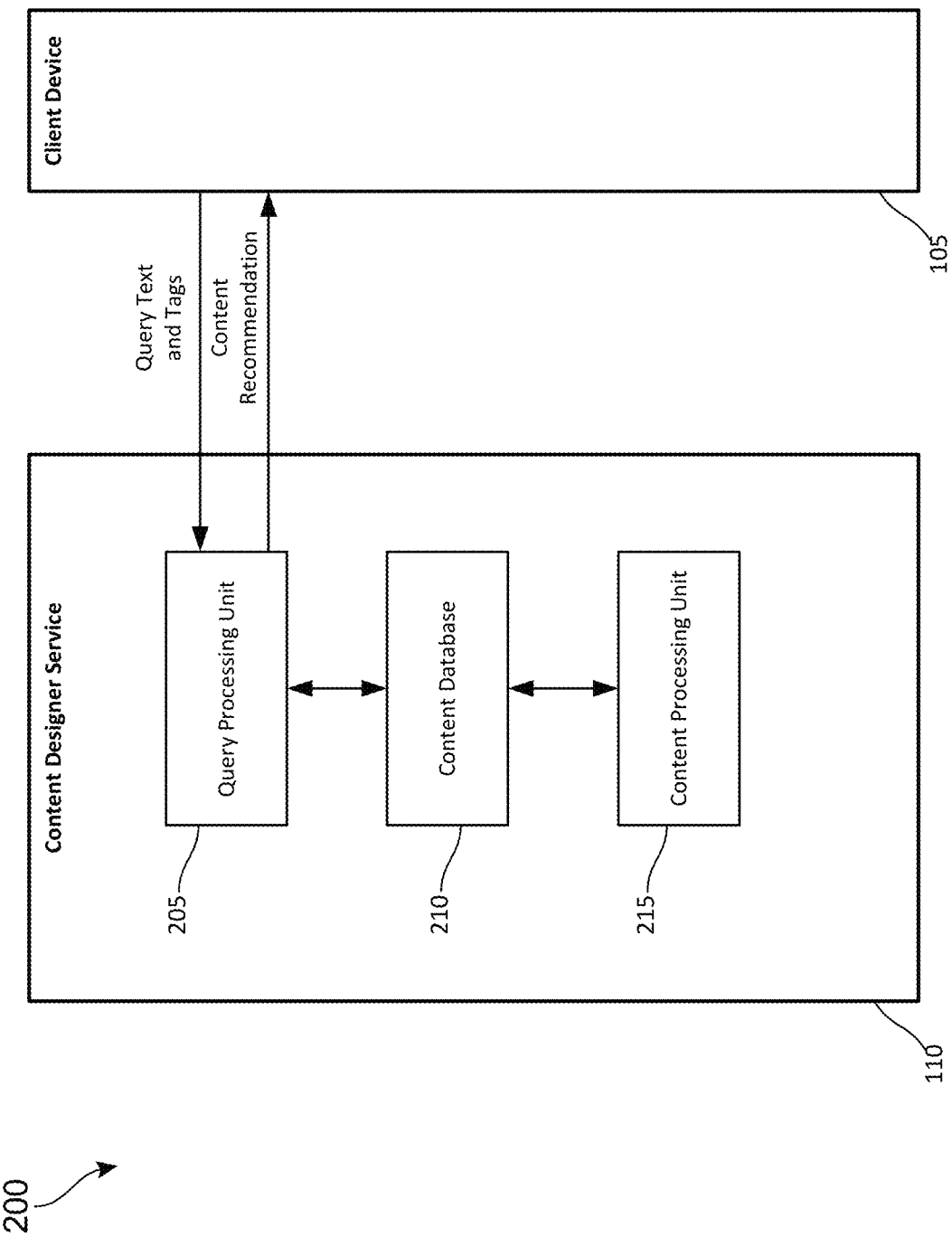
FIG. 2 is an example architecture that may be used, at least in part, to implement the content designer service shown in FIG. 1.

FIG. 2 is an example architecture 200 that may be used, at least in part, to implement the content designer service 110. The content designer service may include a query processing unit 205, a content database 210, and a content processing unit 215.

The query processing unit 205 is configured to facilitate user queries for content recommendations. The client device 105 of the user may provide a query text and optional tags to the content designer service 110. The query text may include one or more keywords, a phrase, or textual description of content for which the user would like to obtain a content recommendation.

To illustrate this feature, assume that the user is designing an invitation for a child's birthday party. The user may enter the following keywords in a search field of a search interface provided by the content designer service 110: "birthday party invitation 10 year old girl." The query processing unit 205 may use the query text entered by the user to find content recommendations for invitations for a tenth birthday party for a girl in the content database 210. The content recommendations may include one or more birthday party invitation templates that may be modified by the user to create a birthday invitation for the birthday party. The birthday invitation may then be distributed electronically to invitees, printed, posted to social media, printed, stored on the client device 105 of the user or a file hosting service, and/or otherwise processed by the content designer service 110. While this example describes the creation of a party invitation, the types of documents and the topics associated therewith are not limited to this specific example.

The content database 210 may include content recommendations for numerous topics. The content items included in the content database 210 may be analyzed and encoded by one or more machine learning models to facilitate the searching functionality provided by the query processing unit 205. Each content item may also be associated with one or more tags associated with a topic of the content item. The content processing unit 215 may be configured to analyze and encode the content items included in the content database 210. Additional details of the content database 210 and the content processing unit 215 are provided in the examples which follow.

Figure 3:
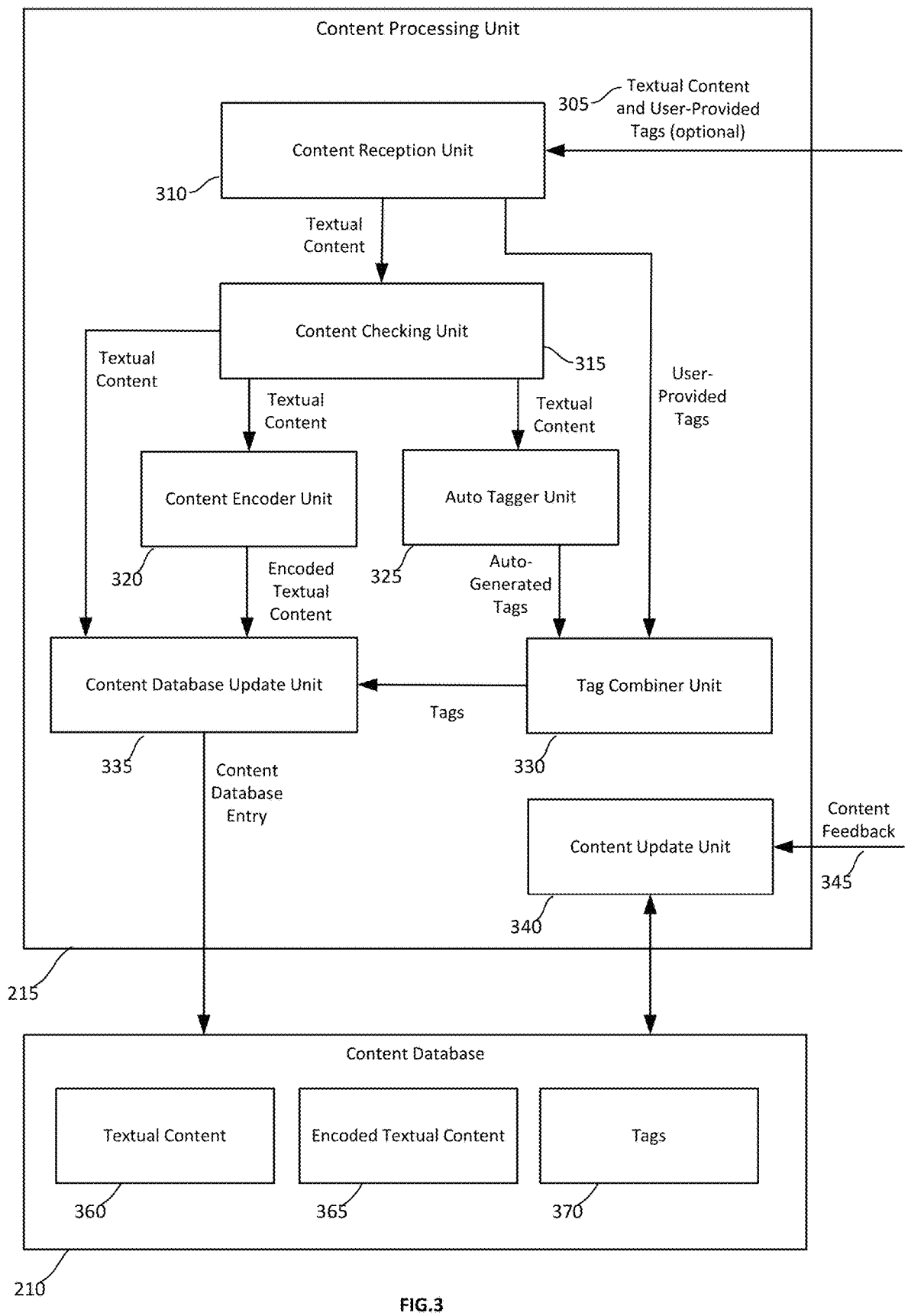
FIG. 3 is a diagram of an example implementation of the of the content processing unit and the content database shown in FIG. 2.

FIG. 3 is a diagram that shows an example implementation of the content processing unit 215 and the content database 210. The content processing unit 215 may include a content reception unit 310, a content checking unit 315, content encoder 320, an auto tagger unit 325, a content database update unit 335, a tag combiner unit 330, and a content update unit 340. The content processing unit 215 is configured to process content items to be added to the content database 210 to facilitate searching for content recommendations in the content database 210.

The content receipt unit 310 may be configured to receive a content item to be added to the content database 210. The content item may be human-generated textual content or may be machine-generated textual content. The content items may be generated by one or more machine learning models configured to generate content items associated with various topics that may be searched by a user. The machine-generated content items may be reviewed by a human prior to adding the machine-generated textual content items to the content database 210 to ensure that the content is appropriate for presentation to users and does not include any potentially offensive or objectionable content. A content item may include textual content appropriate for the topic associated with the content item and may include graphical content, such as an image, drawings, an icon, or other visual content. The content items may also be in various file formats, such as a word processing file format, a presentation file format, an image file, or other file format. The textual content may include one or more content elements that may be highlighted or otherwise identified as elements of the textual content should be updated by the user using the textual content item. For example, a content item for a birthday party invitation may include content elements representing the name of the person for whom the party is being given, the date and time of the party, the person's age, the location of the party, and the contact information for responding to invitation. Other types of content items may have other elements of the textual content that should be updated to replace placeholder text included in the content item.

The textual content 305 may also include one or more user-provided tags associated with the textual content. The tags are optional and may not be included with every textual content item 305 to be added to the content database 210. The tags may be added by a human user to indicate a topic or subject matter of the content item 305. For example, a tag associated with a birthday party invitation may include the tags: birthday, party, and celebration. Other tags may be associated with other content items that associated with a different topic or subject matter.

The content processing unit 215 may be configured to receive textual content items as part of a batch process for process for populating the content database 210. The content designer service 110 may provide a user interface that enables an authorized user to upload textual content items to be analyzed by the content processing unit 215 and added to the content database 210. The user interface may also provide means for the authorized user to associate one or more optional tags with the content items that may provide additional information about the topic or subject matter of the content items.

The content reception unit 310 may provide the textual content to be added to the system to the content checking unit 315 for processing. The content checking unit 315 may analyze the textual content using one or more machine learning models and/or one or more policies configured to identify potentially offensive, obscene, or other prohibited language included in the textual content. The content checking unit 315 may be configured to reject the textual content 305 responsive to detecting potentially offensive, obscene, or other prohibited language. Rejected content items may be flagged for manual review by an authorized human user to ensure that the content items do not include any potentially offensive, obscene, or other prohibited language. The content item 305 may be edited and resubmitted to the content processing unit 215 by the authorized user. If the textual content 305 does not include any potentially offensive, obscene, or other prohibited language, the content reception unit 310 may provide the textual content 305 to the content encoder unit 320 and the auto tagger unit 325 as an input.

The content encoder unit 320 analyzes the textual content 305 using a machine learning model configured to encode the textual content into a representation of the textual input as understood by the machine learning model. For example, the content encoder unit 320 may output an array or vector of floating-point values that represents features of the textual content 305. Other implementations may encode the textual content 305 into a different representation of the features of the textual content 305.

The auto tagger unit 325 analyzes the textual content 305 using a machine learning model or machine learning models configured to analyze the textual content 305 and to generate one or more tags that may be associated with the textual content 305. The tags may represent a topic or subject matter of the textual content 305. The tags may be used to improve the accuracy of the recommendations provided in response to user queries for content recommendations. The auto-generated tags output by the auto tagger unit 325 may be combined with the one or more user-provided tags included with the textual content 305. The tag combiner unit 330 may be configured to combine the set of auto-generated tags with the set of user-provided tags (if any) which were provided with the textual content 305. The tag combiner unit 330 may then provide the combined set of tags to the content database update unit 335 as an input.

The content database update unit 335 is configured to receive the textual content 305, the encoded textual content, and the tags as an input. The content database updated unit 335 is configured to create a new entry in the content database 210 for each textual content 305 received by the content processing unit 215. The content database update unit 335 may create a new index in the content database 210.

The content database update unit 335 may insert the textual content 305 into the content database 210 as textual content 360, the encoded textual content as the encoded textual content 365, and the tags as the tags 370. The textual content 360, the encoded textual content 365, and the tags 370 for the newly created entry in the content database 210 are associated with the index created to facilitate querying of the content database 210.

The content processing unit 215 may also include a content update unit 340. The content update unit 340 may be configured to receive content feedback 345 provided by users of the content designer service 110. The content designer service 110 may provide a means for a user to report a content recommendation for various reasons. The content recommendation may include a button, link, or other user interface element that may be activated by a user to report the content recommendation. The content feedback may indicate that the content recommendation includes offensive, obscene, or other prohibited language. The content update unit 340 may be configured to flag the content item entry associated with the content feedback to prevent the content item at least temporarily from being provided as a content recommendation. The content processing unit 215 may generate a report that identifies content items that have been flagged by users. The content items included in the report may be reviewed by a human reviewer to determine whether the content item includes offensive, obscene, or other prohibited language. The content processing unit 215 may provide a user interface that enables the reviewer to indicate that the content item should be removed, and the content update unit 340 may remove the content items from the content database 210. The user interface may also enable the user to indicate that the content item does not appear to include any offensive, obscene, or other prohibited language. The reviewer may indicate that the content item should be released from the hold placed on the content item, and the content update unit 340 may update the record associated with the content item in the content database 210 to indicate that the content item may be included in subsequent content recommendations.

The content feedback may also indicate that the content item is an incorrect match for the query entered by the user. For example, the user may have been searching for a flyer for a garage sale, but the recommendation received was for an open house for selling a home. The content update unit 340 may provide a user interface that enables a reviewer to update the tags 370 associated with the content item. The content update unit 340 may also perform other actions, such as provide feedback to the models used by the content encoder unit 320 and/or the auto tagger unit 325 to cause the models to update the interferences made by the models. The content update unit 340 may also trigger the content encoder unit 320 to reencode the content item and/or the auto tagger unit 325 to regenerate the auto-generated tags after providing feedback to the models of the content encoder unit 320 and/or the auto tagger unit 325. The updated encoded textual content and/or the updated tags may be used to update the record associated with the content item in the content database 210.

The content update unit 340 may also be configured to identify content items that are infrequently utilized and to retire those items. The content database 210 may include information indicating the number of times that a particular content item has been recommended to a user, the number of times that the content item has been selected for use by a user after being recommended to the user, when the content item was added to the content database 210, and when the content item has last been selected by a user for use in creating new content. The content update unit 340 may remove content that has not been selected by a user at least a minimum number of times within a predetermined time period. The content update unit 340 may also remove the content item from the content database 210 if the content item has received a poor rating from users. The content designer service 110 may provide means for users to rate the content items that have been recommend to the user. The content update unit 340 may automatically remove content items that have been reviewed a minimum number of times and have a rating below a minimum ratings threshold.

Figure 4:
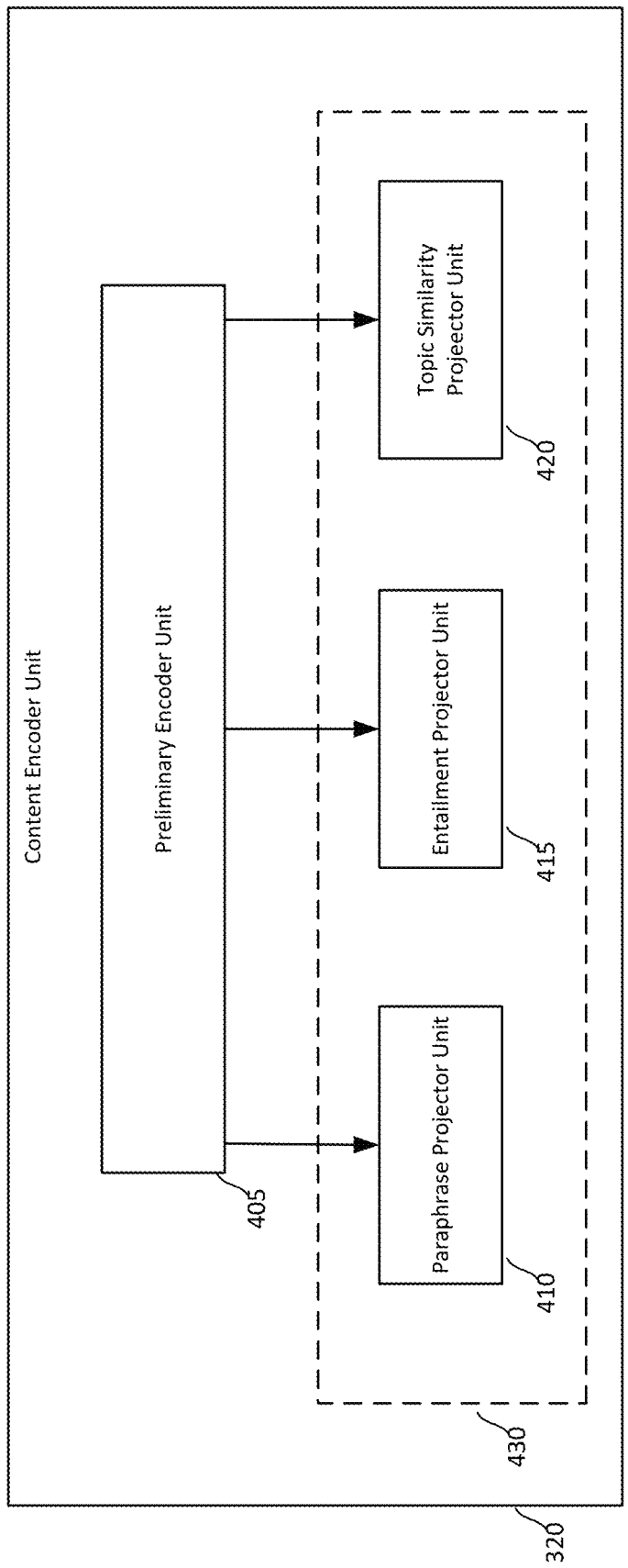
FIG. 4 is a diagram of an example implementation of the content encoder unit shown in FIG. 3.

FIG. 4 is a diagram of an example implementation of the content encoder unit shown 320 in FIG. 3. The content encoder unit 320 may encode the content in more than one way to facilitate querying for content items in the content database 210 based on different attributes of the content items. The example implementation shown in FIG. 4 includes a preliminary encoder unit 405 and a projector layer 430. The projector layer 430, also referred to herein as a task-specific layer, includes projectors configured to modify and adapt the encoded version of the content text to specific tasks. In this example, the projector layer 430 includes three projectors: a paraphrase projector unit 410, an entailment projector unit 415, and a topic similarity projector unit 420. The task-specific encodings facilitate matching search queries submitted by the user with a particular content item based on the task-specific encodings, which may provide more accurate and useful content item recommendations in response to user queries. Each of the encodings associated with a content item may be stored as the encoded textual content 365 stored in the content database 210.

The preliminary encoder unit 405 is a machine learning model trained to extract features from textual content of a content item and to output this feature information. The encoded information may, for example, be an array or vector of floating-point numbers or other values that represent the features extracted from the textual input. These values will be used to facilitate searching for content items based on features of the content information.

The paraphrase projector unit 410 modifies the values output by the preliminary encoder unit 405 to facilitate matching the content item with search queries which restate the meaning of the content item using other words. Users may enter queries that include keywords or phrases that express the same idea using different words. The content database 210 may include content items that express the same meaning using different words, and these content items may be appropriate for recommending to the user. The paraphrase projector unit 410 may be a machine learning model configured to modify one or more values of the output of the preliminary encoder unit 405 so that the modified encoding generated by the paraphrase projector unit 410 is more likely to match with search queries that express the same or similar idea as the content item.

The entailment projector unit 415 modifies the values output by the preliminary encoder unit 405 to facilitate matching the content item with search queries which imply or logically follow from the content item or vice versa. To illustrate this concept, the content item may recite: "New York City is a city includes five boroughs: The Bronx, Manhattan, Brooklyn, Queens, and Staten Island." and the query text may recite "Manhattan is in New York City." The content item entails the query text because the content item cannot be true without the query text also reciting a true statement. The entailment projector unit 415 may be a machine learning model configured to modify one or more values of the output of the preliminary encoder unit 405 so that the modified encoding generated by the paraphrase projector unit 410 is more likely to match with search queries that entail the content item or vice versa.

The topic similarity projector unit 420 modifies the values output by the preliminary encoder unit 405 to facilitate matching the content item with search queries representing the same or similar topic and/or that fall within a particular domain. The topic similarity projector unit 420 may be a machine learning model configured to analyze the encoding output by the preliminary encoder unit 405 to identify a topic or domain associated with the content text and to modify the encoding generated by the preliminary encoder unit 405 so that the modified encoding is more likely to match with search queries that express the same or similar topic or domain as the content item.

Each of the encodings provided by the paraphrase projector unit 410, the entailment projector unit 415, and the topic similarity projector unit 420 may be stored with the encoded textual content 365. Each of these encodings may be weighted equally when the query processing unit 205 is processing a search query. In other implementations, the encodings may be each assigned a weight. Some encodings may be weighted more heavily than others when identifying content item recommendations in the content database 210. The weights may be predetermined. In other implementations, the weights may be configurable by an authorized user of the content designer service 110 to fine-tune the recommendations provided in response to user queries.

Figure 5A:
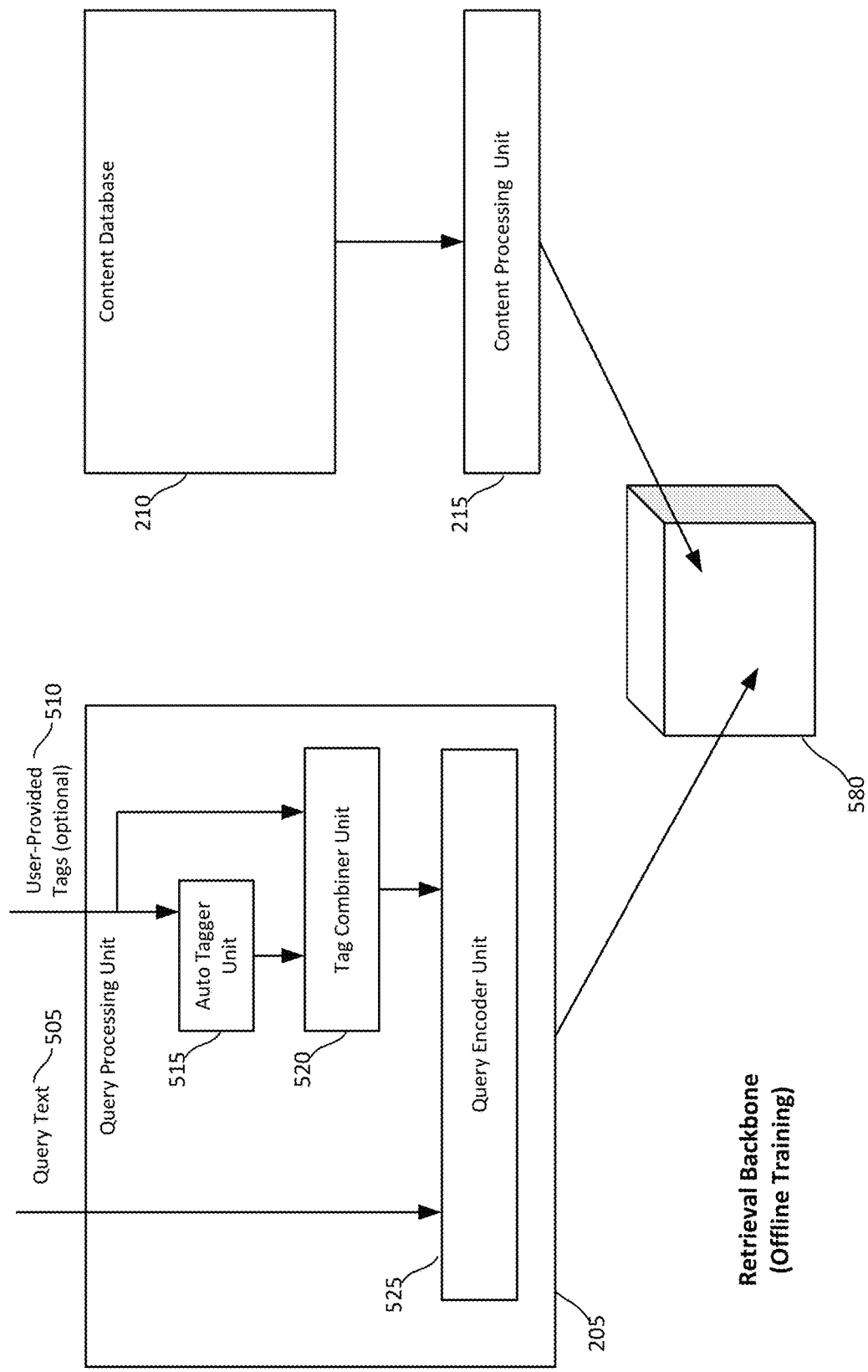
FIG. 5A is a diagram showing offline training of the retrieval backbone of the content designer service shown in the preceding figures.

FIG. 5A is a diagram showing offline training of the retrieval backbone of the content designer service shown in the preceding figures. Both the query processing unit 205 and the content processing unit 215 include models that should be trained so that the content designer service 110 may provide useful and accurate content recommendations in response to user queries.

FIG. 5A shows additional details of the query processing unit 205. The query processing unit 205 is configured to receive a query text 505 provided by the user and one or more user-provided tags 510. The query text may include one or more keywords, a phrase, or textual description of content for which the user would like to obtain a content recommendation. The one or more user-provided tags 510 may indicate a topic or subject matter associated with the content recommendations for which the user is searching. The user-provided tags 510 are optional and may not be provided with the query text 505. The query processing unit 505 may include an auto tagger unit 515 which operates similarly to the auto tagger unit 325 of the content processing unit 215. The output of the auto tagger unit 515 and the user-provided tags are provided as an input to the tag combiner unit 520. The tag combiner unit 520 operates similarly to the tag combiner unit 330 of the content processing unit 215. The query encoder unit 525 may operate similarly to the content encoder unit 320 of the content processing unit 215. In some implementations, the query encoder unit 525 may be configured to include the tags as part of the encoded query. Similarly, the content encoder unit 320 may include the tags provided with the content item.

The content designer service 110 is implemented using two tower architecture for implementing the search functionality provided by the service. The content database 210 may include a vast number of content items that may be provided as content recommendations in response to a user query. A large content database 210 may include millions or even billions of entries. The two-tower architecture facilitates efficient and fast querying of such a large content database 210 by separating the encoding of the content items and the query text into two separate paths. The content items may be encoded in advance and the encoded content may be represented by a hyper-dimensional latent space (HDLS) 580. The HDLS 580 is a multi-dimensional representation of the encoded content items. Content items that are similar to one another are located closer to one another in the HDLS 580, while content items that are dissimilar to one another are located farther from one another in the HDLS 580. The HDLS 580 is very dense and may include millions or more encoded content items.

The models used by the both the query processing unit 205 and the content processing unit 215 are trained such that the embeddings representing the encoded query text and the encoded content items fall within the same HDLS 580. The models of the query processing unit 205 and the content processing unit 215 may be trained using the same training data or training data derived from the same source so that the models converge on the same HDLS 580.

Once the models have been trained, the content database 210 may be populated with live data that may be provided as recommendations to users. The data used to train the models of the content processing unit 215 may be live data in some implementations and may provide an initial set of content items that may be used to provide content to users. Additional content items may be processed by the content processing unit 215 to populate the content database 210. Once the models have been trained and the content database 210 populated with at least an initial set of contents, user queries for content recommendations may be enabled on the content designer service 110.

Figure 5B:
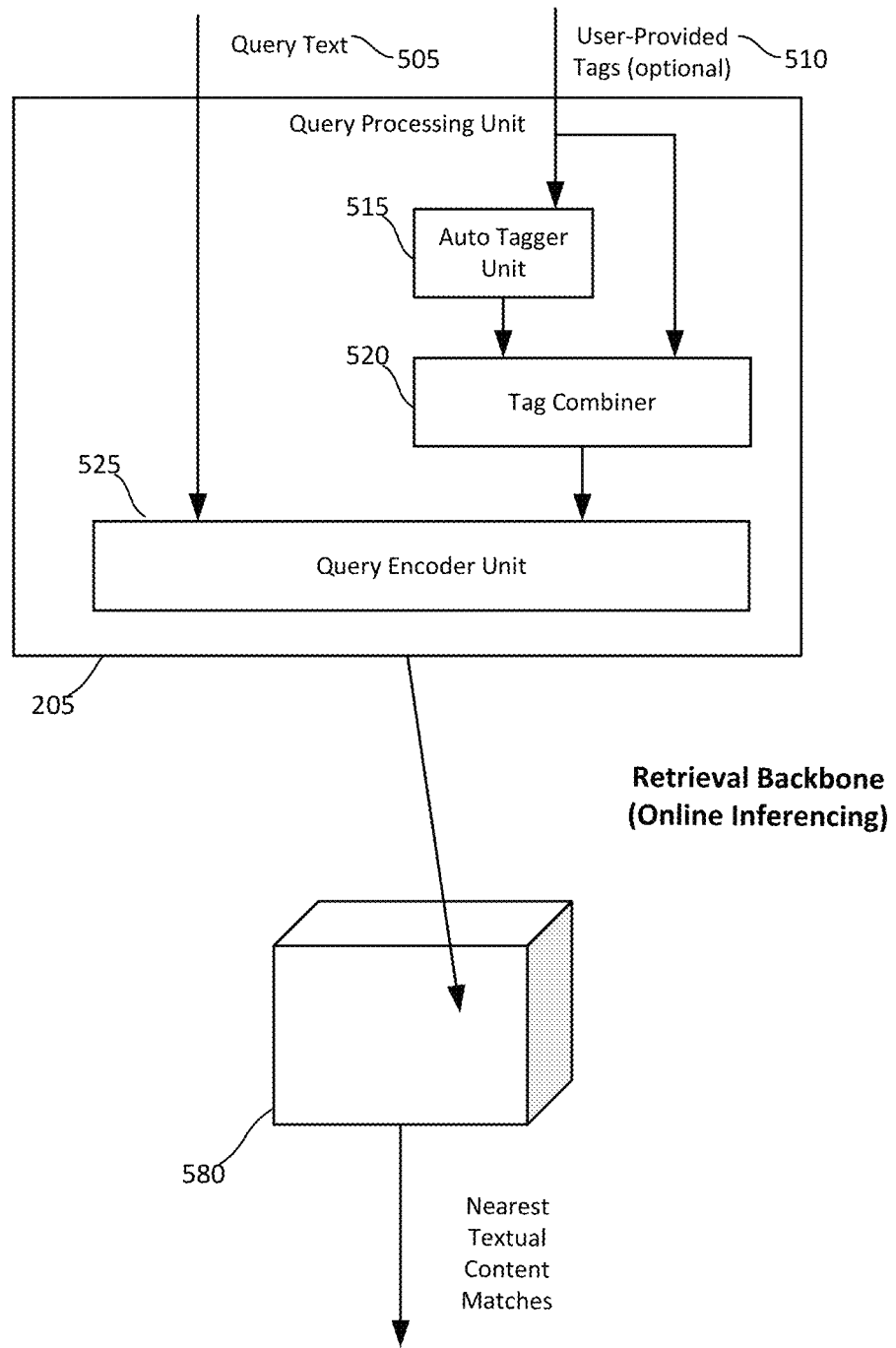
FIG. 5B is a diagram showing the retrieval backbone of the content designer service supporting an online query.

FIG. 5B is a diagram showing the retrieval backbone of the content designer service supporting an online query by a user. The retrieval backbone provided by the HDLS 580 may be used to support queries once the models of the used by the query processing unit 205 and the content processing unit 215 have been trained. The content items have already been processed in advance and added to the content database 210 with their respective encodings and tags.

The HDLS 580 facilitates low latency execution of user queries. The query text of user queries is encoded using a similar process used to encode the content items. The encoded query text is mapped into the HDLS 580. Because the query text is mapped into the same HDLS 580 as the encoded content items, the query processing unit 205 can identify content items that are similar to the query text based on the distance that the encoded content items are from the encoded query text in the HDLS 580. The query processing unit 205 may be configured to identify a content item as being similar to the query text if the distance between the encoded query text and the content item is less than a similarity threshold. The similarity threshold may be configurable to adjust how similar a content item should be to the query text in order to be selected as a potential content recommendation.

Figure 9:
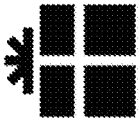
FIG. 9 is an example of a user interface for searching for and presenting content item recommendations that may be provided by the content designer service.

The query process operates similarly to the query processing that occurs during the training process described in FIG. 5A. The user submits query text 505 and optional user-provided tags 510. The query text may be submitted through a search user interface provided by the content designer service 110, such as the user interface 905 shown in FIG. 9. The user interface 905 includes a search pane 915 that includes a field in which the user may enter a search query. The search pane 915 also includes checkboxes for topic filters. The user may click on or other otherwise activate the checkbox associated with one or more topics to narrow the recommendations provided by the content recommendation system to the selected topics. The user may activate the "Search" button to cause the query text entered by the user and the optionally selected query topics to be submitted to query processing unit 205. Each selected topic may be provided to the query processing unit 205 as a tag associated with the query text. The results of the search may be presented to the user in the content pane 910. In the examples show in FIG. 9, the content recommendations are shown as a set of thumbnails. The user may browse through the thumbnails and select a thumbnail to display the content item associated with the thumbnail. The user may also select a content item to use as a starting point for creating their own customized content.

Returning now to FIG. 5B, the query text 505 and any optional tags 510 selected by the user are provided as an input to the query processing unit 205. The query encoder unit 525 encodes the query text and may also encode the tags with the encoded query text. The tags may be used to further refine the content items recommended to the user. The query processing unit 205 may then formulate a query to search the content database 210 to identify content items that satisfy the query. The query processing unit 205 may be configured to compare the encoded query text with the encoded textual content 365 stored in the content database 210 to identify nearest content item matches. The query processing unit 205 may obtain the original unencoded copy of the content items from the textual content stored in the content database 210 for each match as textual content 360. In some implementations, the content designer service 110 may cause a single content item that is the closest match to the query text may be presented to the user on a user interface of the client device 105. In other implementations, the content designer service 110 may present a user interface (such as that shown in FIG. 9) on the client device 105 that presents multiple content items that matched the query text. The user interface may provide the user with a means for browsing the content recommendations and for selecting a content item from the recommendations for use in creating content.

The query processing unit 205 may be configured to use various optimization techniques to speed up the query of the content database 210. The query processing unit 205 may use one or more approximate computing techniques to reduce latency in obtaining content recommendations in response to a user query. These techniques may result in the query processing unit 205 returning acceptable content item recommendations in response to the user query but may not always return the content item that is a closest match for the user query. The query processing unit 205 may utilize a bounded approximate technique that returns results that fall within a distance range of the encoded query text in the HDLS 580.

Figure 6:
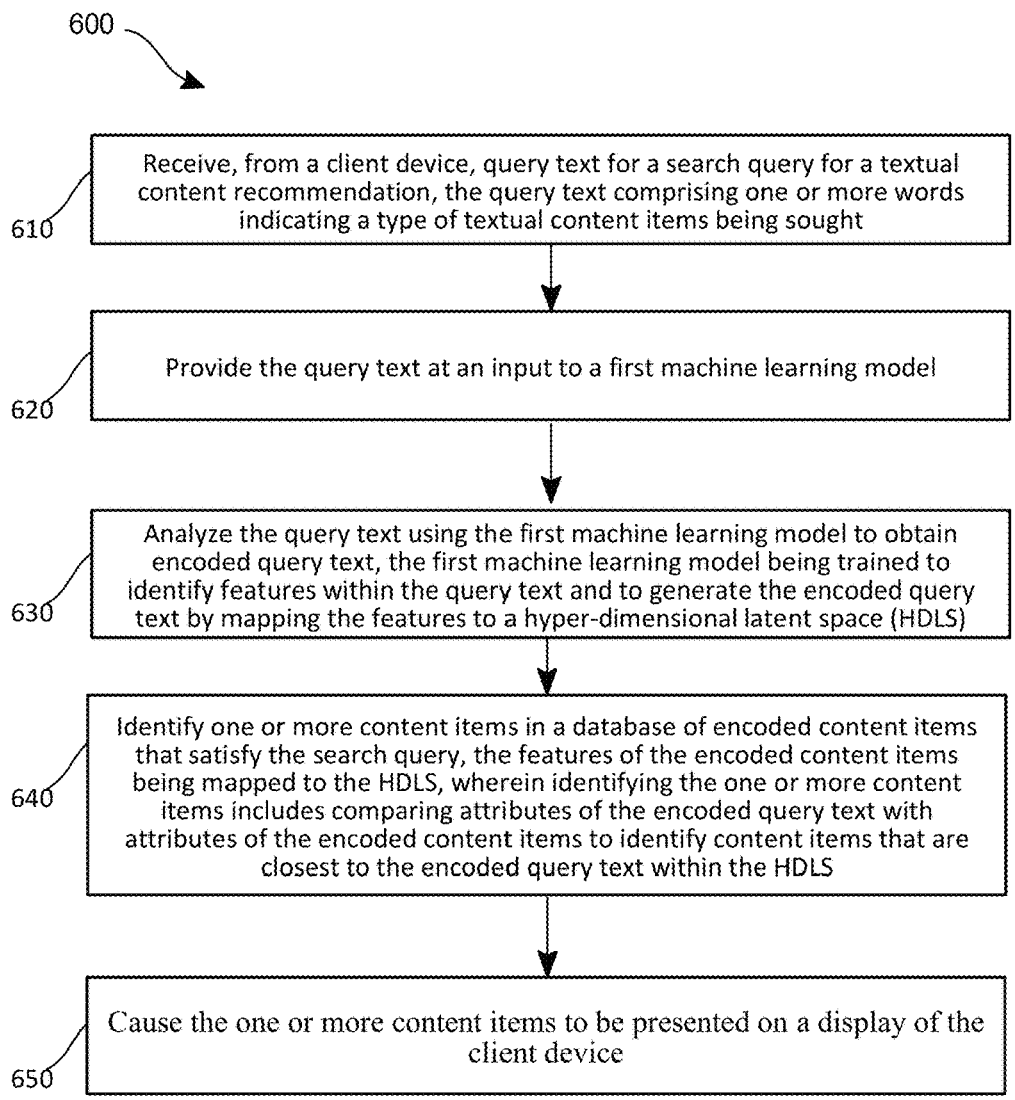
FIG. 6 is a flow diagram of another process for providing content recommendations.

FIG. 6 is a flow chart of an example process 600. The process 600 may be implemented by the content designer service 110. The process 600 may be used to execute a query for content recommendations the content database 210.

The process 600 may include an operation 610 of receiving, from a client device 105, query text for a search query for a textual content recommendation. The query text includes one or more words indicating a type of textual content items being sought. The one or more words may include one or more keywords, a phrase, or textual description of content for which the user would like to obtain a content recommendation.

The process 600 may include an operation 620 of providing the query text at an input to a first machine learning model, and an operation 630 of analyzing the query text using the first machine learning model to obtain encoded query text. The first machine learning model is trained to identify features within the query text and to generate the encoded query text by mapping the features to a hyper-dimensional latent space (HDLS). The query processing unit 205 of the content designer service 110 is configured to analyze and encode the query text as discussed in the preceding examples.

The process 600 may include an operation 640 of identifying one or more content items in a database of encoded content items that satisfy the search query. The features of the encoded content items are mapped to the HDLS and identifying the one or more content items includes comparing attributes of the encoded query text with attributes of the encoded content items to identify content items that are closest to the encoded query text within the HDLS. As discussed in the preceding examples, the closer that the encoded query text is to an encoded content item within the HDLS, the more relevant the content item is likely to be to the search query.

The process 600 may include an operation 650 of causing the one or more content items to be presented on a display of the client device. The one or more content items may be presented on a display of the client device 105 of the user.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
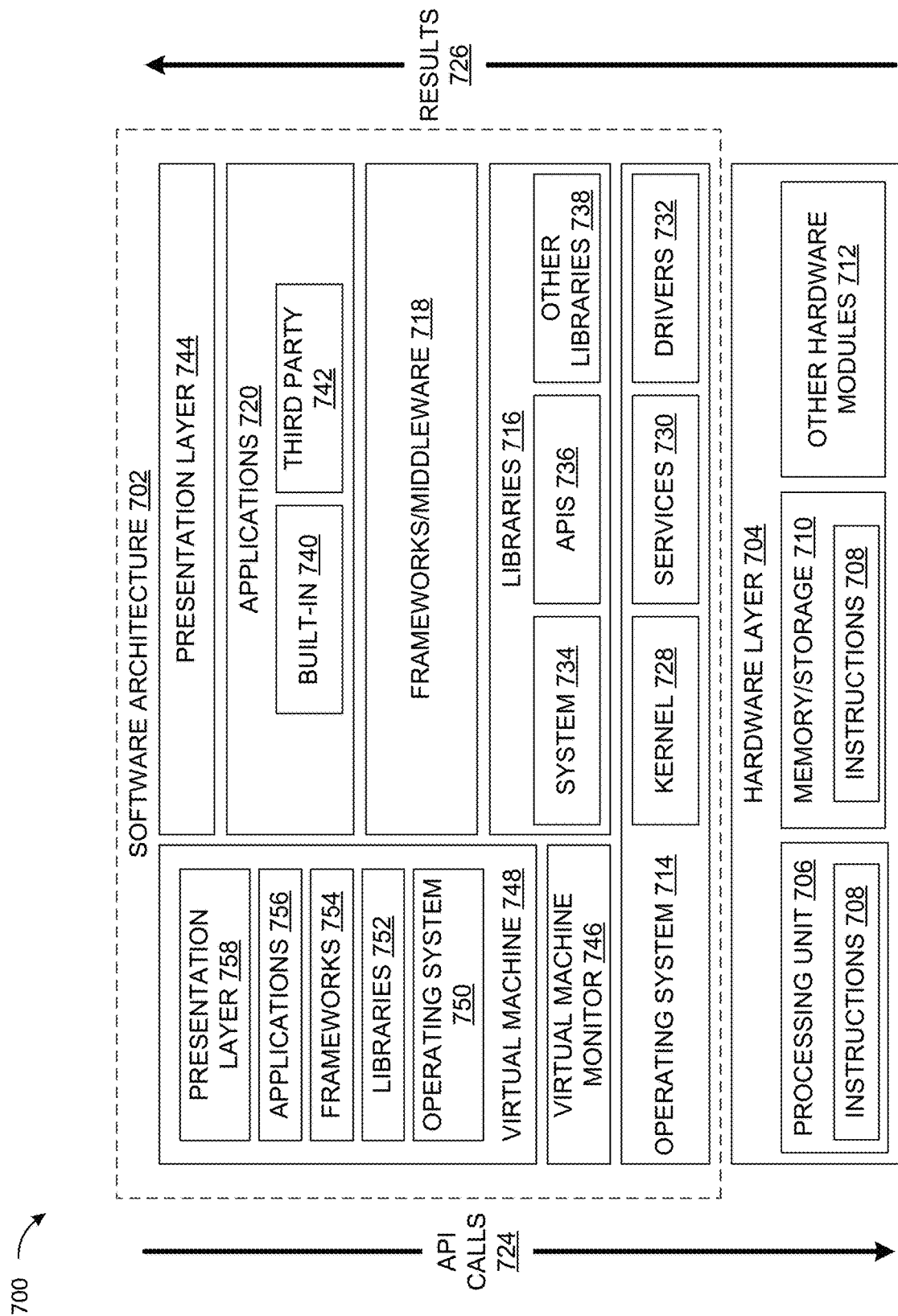
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
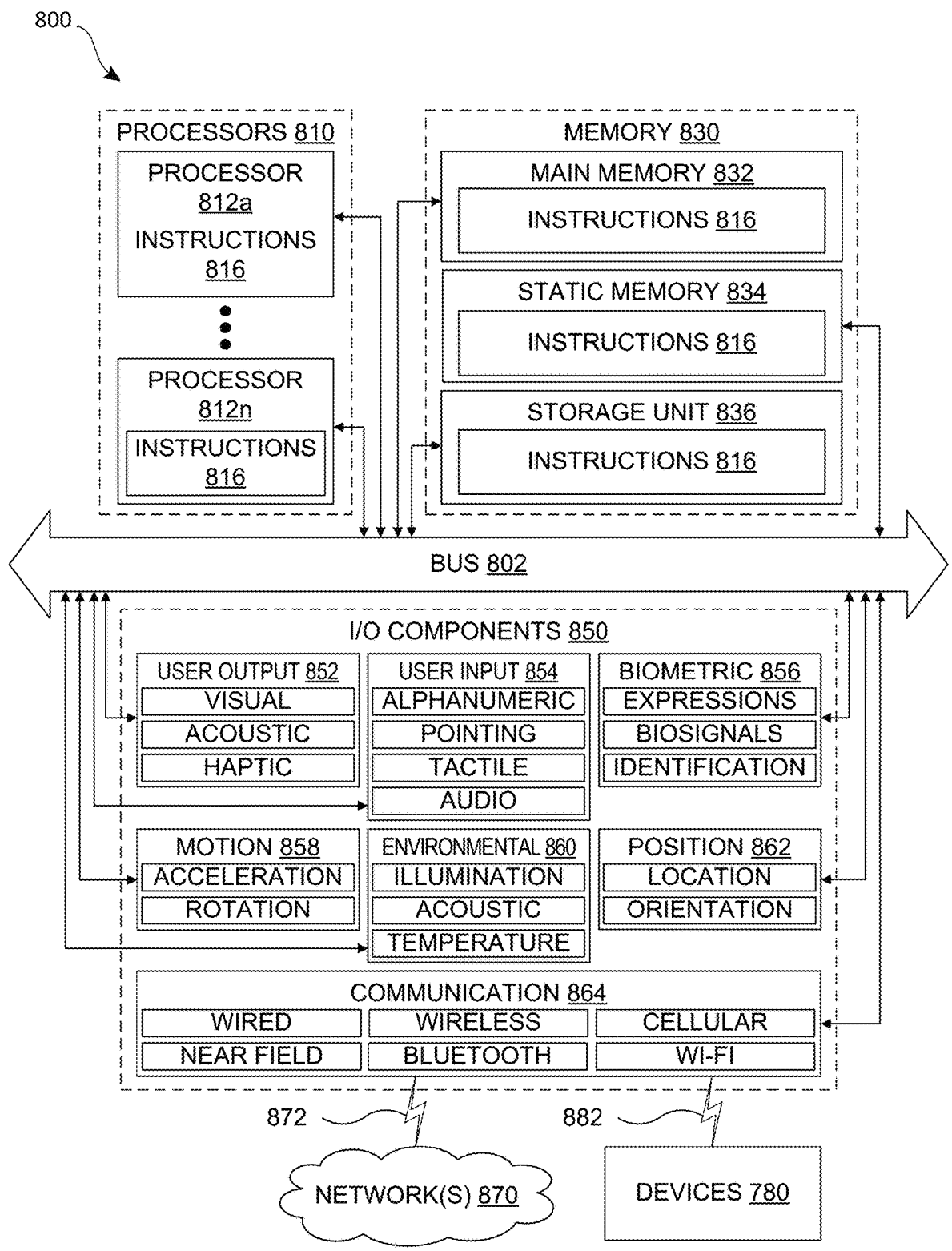
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor to perform operations comprising:
receiving, from a client device, query text for a search query for a textual content recommendation, the query text comprising one or more words indicating a type of textual content items being sought;
providing the query text at an input to a first machine learning model;
analyzing the query text using the first machine learning model to obtain encoded query text, the first machine learning model being trained to identify features within the query text and to generate the encoded query text by mapping the features to a hyper-dimensional latent space (HDLS);
identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and
causing the one or more content items to be presented on a display of the client device.

2. The data processing system of claim 1, wherein the machine-readable storage medium includes instructions configured to cause the processor to perform operations of:
receiving, from the client device, one or more first tags associated with the search query, each tag of the one or more first tags identifying a topic associated with the search query; and
analyzing the query text and the first tags with the first machine learning model to obtain the encoded query text.

3. The data processing system of claim 2, wherein the machine-readable storage medium includes instructions configured to cause the processor to perform operations of:
providing the query text as an input to a second machine learning model;
analyzing the query text with the second machine learning model, the second machine learning model being configured to analyze a textual input and to generate one or more second tags associated with the query text, each tag of the one or more second tags identifying a topic included in the query text; and
combining the one or more second tags with the one or more first tags prior to analyzing the query text and the first tags with the first machine learning model.

4. The data processing system of claim 1, wherein the machine-readable storage medium includes instructions configured to cause the processor to perform operations of:
identifying the one or more content items in the database of encoded content items includes selecting the one or more content items based on a similarity threshold.

5. The data processing system of claim 1, wherein the machine-readable storage medium includes instructions configured to cause the processor to perform operations of:
receiving a first content item comprising textual content to be added to the database of encoded content items;
providing the first content item as an input to a second machine learning model;
analyzing the first content item using the second machine learning model to obtain a first encoded content item, the second machine learning model being trained to identify features within the first content item and to generate the encoded content item by mapping the features to the HDLS; and
adding the first encoded content item to the database of encoded content items.

6. The data processing system of claim 5, wherein the machine-readable storage medium includes instructions configured to cause the processor to perform operations of:
processing the first encoded content item with a plurality of task-specific encoders to produce a modified encoded content item; and
adding the modified encoded content item instead of the encoded content item to the database of encoded content items.

7. The data processing system of claim 5, wherein the machine-readable storage medium includes instructions are configured to cause the processor to perform operations of:
analyzing the first content item to determine whether the first content item includes potentially offensive or objectionable content; and
preventing the first content item from being added to the database of encoded content items responsive to determining that the first content item includes potentially offensive or objectionable content.

8. A method implemented in a data processing system for providing content recommendations, the method comprising:
receiving, from a client device, query text for a search query for a textual content recommendation, the query text comprising one or more words indicating a type of textual content items being sought;
providing the query text at an input to a first machine learning model;
analyzing the query text using the first machine learning model to obtain encoded query text, the first machine learning model being trained to identify features within the query text and to generate the encoded query text by mapping the features to a hyper-dimensional latent space (HDLS);
identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and causing the one or more content items to be presented on a display of the client device.

9. The method of claim 8, further comprising:

receiving, from the client device, one or more first tags associated with the search query, each tag of the one or more first tags identifying a topic associated with the search query; and analyzing the query text and the first tags with the first machine learning model to obtain the encoded query text.

10. The method of claim 9, further comprising:

providing the query text as an input to a second machine learning model;

analyzing the query text with the second machine learning model, the second machine learning model being configured to analyze a textual input and to generate one or more second tags associated with the query text, each tag of the one or more second tags identifying a topic included in the query text; and combining the one or more second tags with the one or more first tags prior to analyzing the query text and the first tags with the first machine learning model.

11. The method of claim 8, further comprising:

identifying the one or more content items in the database of encoded content items includes selecting the one or more content items based on a similarity threshold.

12. The method of claim 8, further comprising:

receiving a first content item comprising textual content to be added to the database of encoded content items;

providing the first content item as an input to a second machine learning model;

analyzing the first content item using the second machine learning model to obtain a first encoded content item, the second machine learning model being trained to identify features within the first content item and to generate the encoded content item by mapping the features to the HDLS; and adding the first encoded content item to the database of encoded content items.

13. The method of claim 12, further comprising:

processing the first encoded content item with a plurality of task-specific encoders to produce a modified encoded content item; and adding the modified encoded content item instead of the encoded content item to the database of encoded content items.

14. The method of claim 12, further comprising:

analyzing the first content item to determine whether the first content item includes potentially offensive or objectionable content; and preventing the first content item from being added to the database of encoded content items responsive to determining that the first content item includes potentially offensive or objectionable content.

15. A machine-readable medium on which are stored instructions that, when executed, cause a processor of a programmable device to perform operations of:

receiving, from a client device, query text for a search query for a textual content recommendation, the query text comprising one or more words indicating a type of textual content items being sought;

providing the query text at an input to a first machine learning model;

analyzing the query text using the first machine learning model to obtain encoded query text, the first machine learning model being trained to identify features within the query text and to generate the encoded query text by mapping the features to a hyper-dimensional latent space (HDLS);

identifying one or more content items in a database of encoded content items that satisfy the search query, the features of the encoded content items being mapped to the HDLS, wherein identifying the one or more content items includes comparing attributes of the encoded query text with attributes of the encoded content items to identify content items that are closest to the encoded query text within the HDLS; and causing the one or more content items to be presented on a display of the client device.

16. The machine-readable medium of claim 15, further comprising instructions configured to cause the processor to perform operations of:

receiving, from the client device, one or more first tags associated with the search query, each tag of the one or more first tags identifying a topic associated with the search query; and analyzing the query text and the first tags with the first machine learning model to obtain the encoded query text.

17. The machine-readable medium of claim 16, further comprising instructions configured to cause the processor to perform operations of:

providing the query text as an input to a second machine learning model;

analyzing the query text with the second machine learning model, the second machine learning model being configured to analyze a textual input and to generate one or more second tags associated with the query text, each tag of the one or more second tags identifying a topic included in the query text; and combining the one or more second tags with the one or more first tags prior to analyzing the query text and the first tags with the first machine learning model.

18. The machine-readable medium of claim 15, further comprising instructions configured to cause the processor to perform operations of:

identifying the one or more content items in the database of encoded content items includes selecting the one or more content items based on a similarity threshold.

19. The machine-readable medium of claim 15, further comprising instructions configured to cause the processor to perform operations of:

receiving a first content item comprising textual content to be added to the database of encoded content items;

providing the first content item as an input to a second machine learning model;

analyzing the first content item using the second machine learning model to obtain a first encoded content item, the second machine learning model being trained to identify features within the first content item and to generate the encoded content item by mapping the features to the HDLS; and adding the first encoded content item to the database of encoded content items.

20. The machine-readable medium of claim 19, further comprising instructions configured to cause the processor to perform operations of:

processing the first encoded content item with a plurality of task-specific encoders to produce a modified encoded content item; and adding the modified encoded content item instead of the encoded content item to the database of encoded content items.

\* \* \* \* \*